US005294099A

United States Patent [19]

Dalfino

[11] Patent Number: 5,294,099

[45] Date of Patent: Mar. 15, 1994

[54] HOLDER ASSEMBLY FOR CLENCHING A DOOR IN AN UPRIGHT POSITION

[76] Inventor: Oronzo Dalfino, 118 E. 143rd Ave., Tampa, Fla. 33613

[21] Appl. No.: 4,461

[22] Filed: Jan. 14, 1993

[51] Int. Cl.[5] .......... B23Q 3/02

[52] U.S. Cl. .......... 269/133; 269/905

[58] Field of Search .......... 269/133, 905, 254, 237

[56] References Cited

U.S. PATENT DOCUMENTS

| | | | |
|---|---|---|---|
| 611,340 | 9/1898 | Smith | 269/133 |
| 2,621,687 | 12/1952 | Fordern | 269/133 |
| 4,168,827 | 9/1979 | Hutchinson . | |
| 4,270,741 | 6/1981 | Hurst . | |
| 4,391,437 | 7/1983 | Collins . | |
| 4,695,067 | 9/1987 | Willey . | |

*Primary Examiner*—Robert C. Watson
*Attorney, Agent, or Firm*—John R. Flanagan

[57] ABSTRACT

A holder assembly for clenching a door in upright position includes a pair of jaws having respective horizontal base members and upright clamp member, a pair of resiliently compressible support pads attached to and underlying the outer end portions of the base members for holding the jaws stationary on the floor in a generally non-slip fashion and the outer end portions of the base members in an elevated position above the floor, and a hinge including a pair of side-by-side hinge members and a removable pin pivotally coupling the hinge members to one another so as to establish a door receiving slot between the upright clamp members of the jaws. The base members at adjacent inner end portions thereof and the hinge members attached thereto are allowed to oppositely pivot upwardly away from the support surface to higher than the elevation of the outer end portions of the base members in order to place a door within the slot and to oppositely pivot downwardly toward the support surface to lower than the elevation of the outer end portions of the base members after a door is placed within the slot and the weight of the door is rested on the side-by-side hinge members. The opposite downward pivoting of the jaws at the inner end portions of the base members causes the upright clamp members to pivot toward one another and form a tight gripping hold on opposite sides of the door positioned in the slot between the clamp members.

19 Claims, 2 Drawing Sheets

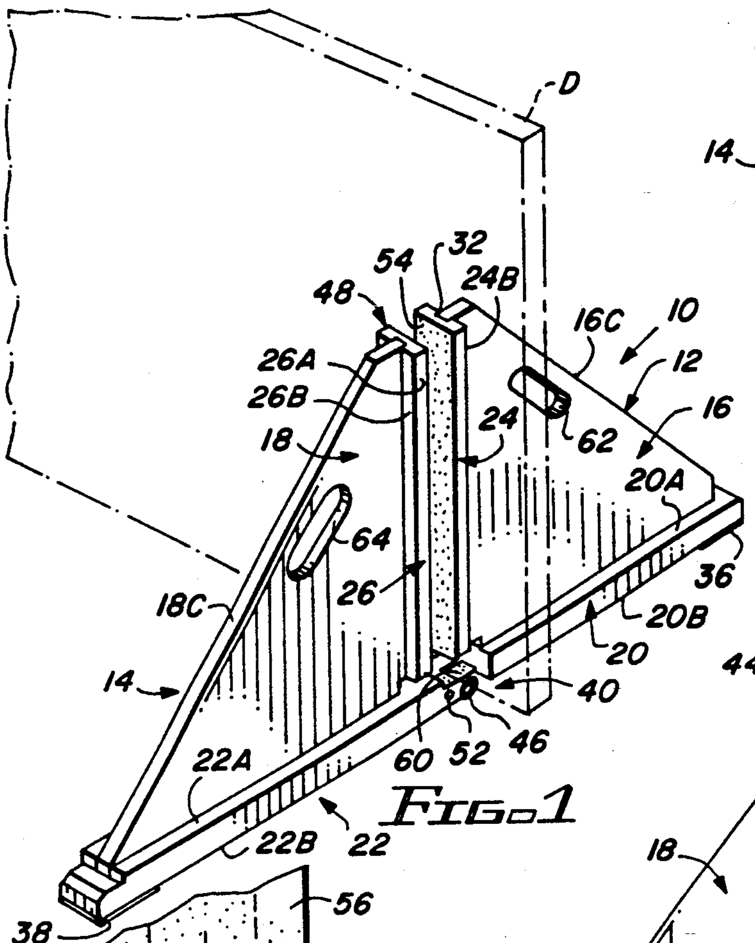
FIG. 1
FIG. 4
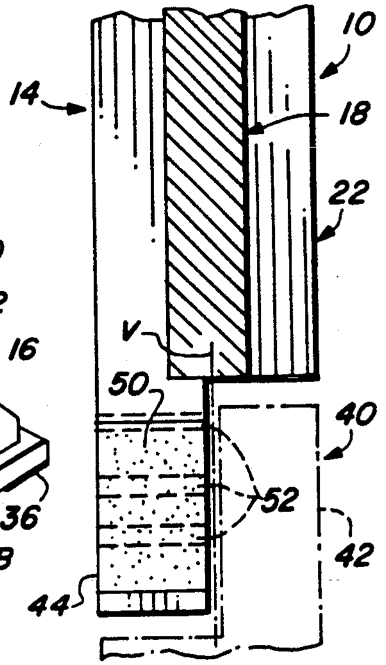
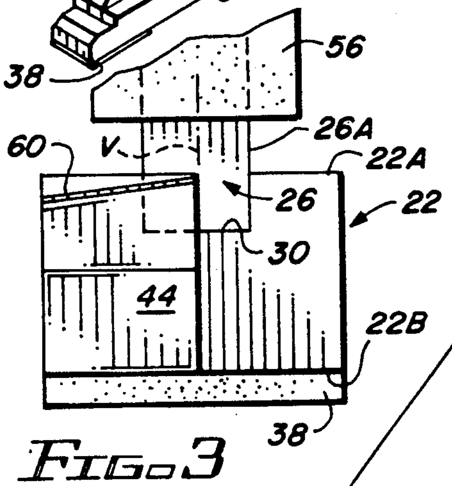
FIG. 3
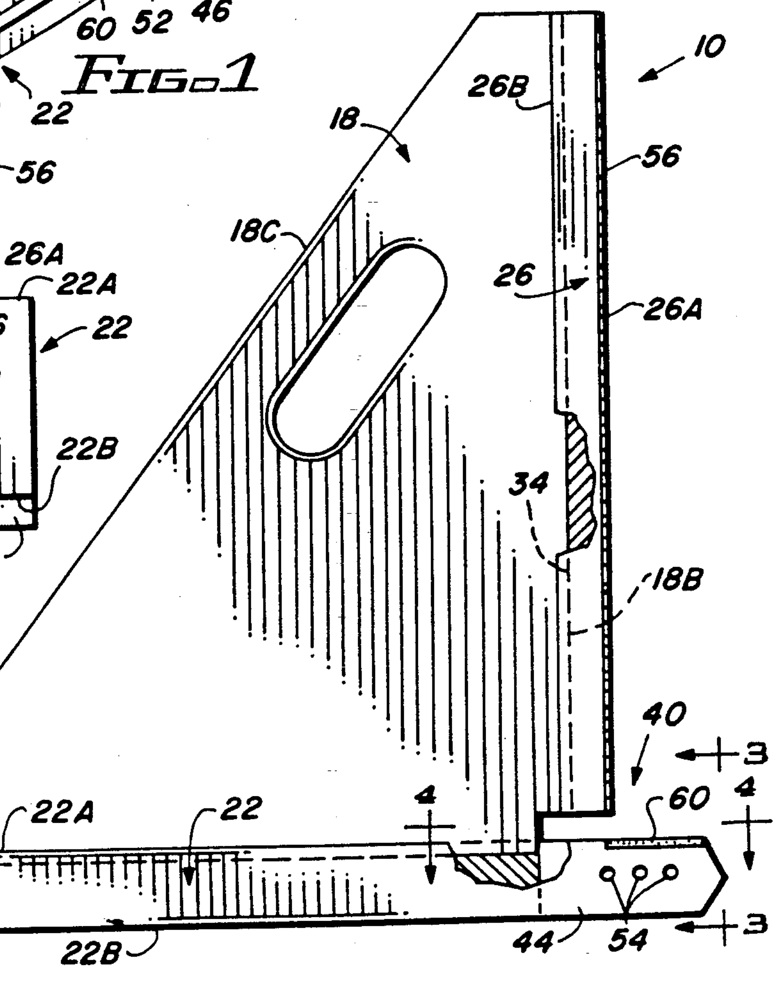
FIG. 2

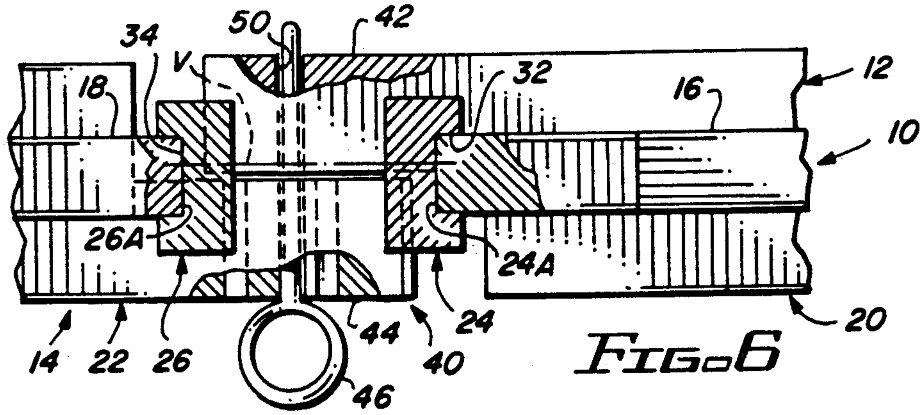
FIG. 6
FIG. 5
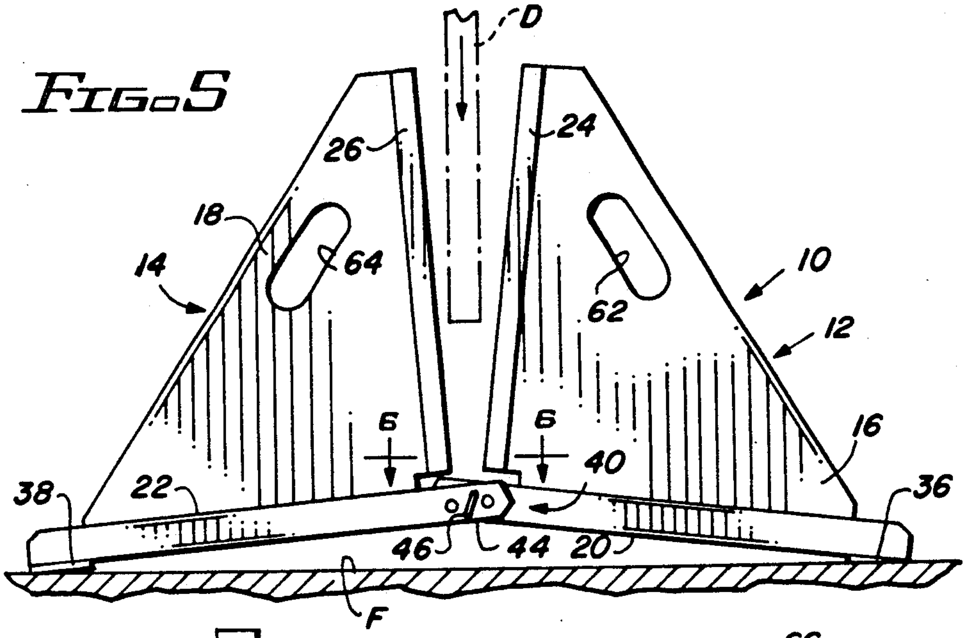
FIG. 7
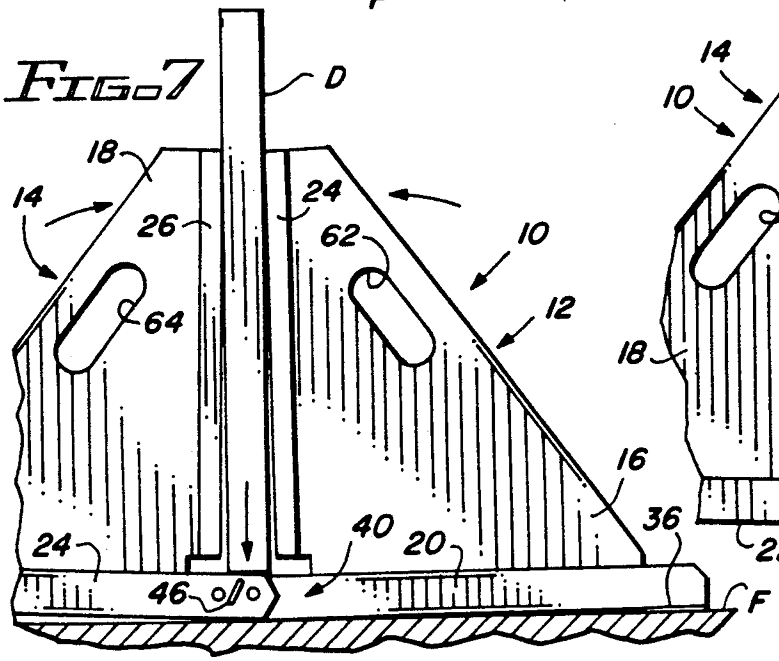
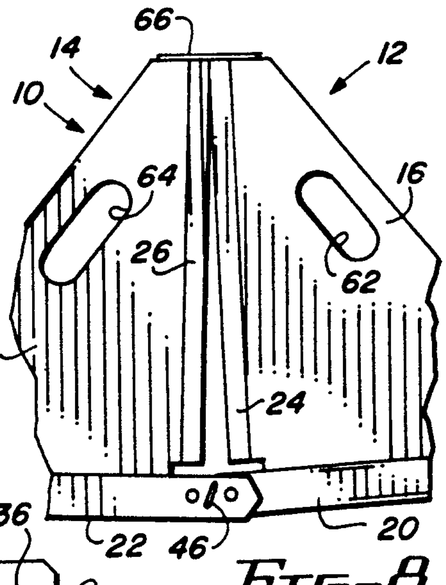
FIG. 8

HOLDER ASSEMBLY FOR CLENCHING A DOOR IN AN UPRIGHT POSITION

BACKGROUND OF THE INVENTION

1. Field of the Invention

The present invention generally relates to workpiece holders and, more particularly, is concerned with a holder assembly for clenching a door or like object in an upright position.

2. Description of the Prior Art

Doors, panels and other relatively thin unwieldy objects are typically held in an upright position to facilitate trimming edges, insetting locks and hinge plates and performing other finishing work. For example, to prepare a door for hanging in a frame, hinges must be mounted on the door edge and excess material usually must be planed from the edge. It is very awkward to hold the door in this position while attempting to work on the door. A carpenter may hold the door with one hand or with his knees or may try to prop it against a saw horse or other support.

Various devices have been proposed in the prior patent art to provide a means to assist the carpenter in this effort. Representative examples of these prior art devices are the ones disclosed in U.S. Pat. Nos. to Hutchinson (4,168,827), Hurst (4,270,741), Collins (4,391,437) and Willey (4,695,067). While these devices constitute a step in the right direction, a need still exists for a door holder which is more convenient, lower in cost, and easier to operate.

SUMMARY OF THE INVENTION

The present invention provides a holder assembly designed to satisfy the aforementioned need. The holder assembly of the present invention replaces bulky saw horses and other devices which are incapable of holding a door or like object being worked on, in a desired and firm position. For sake of brevity, the term "door" will be used hereafter in a generic sense to mean any type of panel-like object.

The holder assembly of the present invention functions in such a way that the door will assist the holder assembly in holding it in the desired vertical position by using its own weight. A clamping force is imposed quickly on the door by its own weight, while the door is released just as quickly when the weight of the door is lifted off the holder assembly.

Accordingly, the present invention is directed to a holder assembly for clenching a door in upright position. The holder assembly comprises a pair of jaws having respective generally horizontal base members and upright clamp members, and a hinge interconnecting adjacent inner end portions of the horizontal base members of the jaws so as to establish a generally vertical door receiving slot between the upright clamp members of the jaws. The hinge includes a pair of side-by-side positioned hinge members and a removable pin pivotally coupling the hinge members together.

The holder assembly also comprises a pair of support pads of substantially resilient compressible non-slip material attached to and underlying opposite outer end portions of the horizontal base members of the jaws for holding the outer end portions of the base members in an elevated position above a support surface and retaining the jaws in a non-slip relation on the support surface. In such manner, the horizontal base members of the jaws at the adjacent inner end portions thereof and the hinge members attached thereto are allowed to oppositely pivot upwardly away from the support surface to higher than the elevation of the outer end portions of the base members in order to place a door within the slot and to oppositely pivot downwardly toward the support surface to lower than the elevation of the outer end portions of the horizontal base members after a door is placed within the slot between the upright clamp members and the weight of the door is rested on the side-by-side hinge members. The opposite downward pivoting of the jaws at the adjacent inner end portions of the base members causes the upright clamp members to pivot toward one another and form a tight gripping hold on opposite sides of the door positioned in the slot between the clamp members.

Also, one of the hinge members is rigidly attached to the inner end portion of one of the horizontal base members, while the other of the hinge members is rigidly attached to the inner end portion of the other of the horizontal base members. The hinge members have widths about one-half of the widths of the base members and are offset along opposite sides of a vertical plane through longitudinal centers of the base members, permitting the hinge members to assume side-by-side positions. The one hinge member has a single hole defined therethrough while the other hinge member has a series of spaced holes defined therethrough such that the removable pin can be adjustably received through preselected aligned ones of the holes of the hinge members for presetting the width of the slot provided between the upright clamp portions of the jaws to match the thickness of the door to be held between the jaws within the slot.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a holder assembly of the present invention, showing a pair of pivotal jaws of the holder assembly in a clenching position in which a door is clamped in an upright position.

FIG. 2 is an enlarged side elevational view of one of a pair of jaws of the holder assembly of FIG. 1.

FIG. 3 is an enlarged fragmentary end elevational view of the jaw as seen along line 3—3 of FIG. 2.

FIG. 4 is an enlarged fragmentary sectional view of the jaw taken along line 4—4 of FIG. 2.

FIG. 5 is a side elevational view of the holder assembly of FIG. 1, showing the pair of jaws of the holder assembly in a releasing position unclamping the door.

FIG. 6 is an enlarged fragmentary sectional view, with portions broken away, of the pair of jaws of the holder assembly taken along line 6—6 of FIG. 5.

FIG. 7 is a fragmentary side elevational view of the holder assembly similar to FIG. 5, but showing the pair of jaws of the holder assembly in the clenching position clamping the door therebetween.

FIG. 8 is a fragmentary side elevational view of the holder assembly similar to FIG. 5, but showing the pair of jaws of the holder assembly latched together at their adjacent upper ends to place them in condition for being carried or transported by gripping handle slots built into the jaws.

DETAILED DESCRIPTION OF THE INVENTION

Referring to the drawings and particularly to FIGS. 1 and 2, there is illustrated a holder assembly, generally designated 10, of the present invention for clenching a door in an upright position. Basically, the holder assembly 10 includes a pair of jaws 12, 14 which will receive and hold a door D in the desired vertical position by using the weight of the door D to support itself. A clamping force is imposed by the jaws 12, 14 on the opposite sides of the door D by using its own weight.

Referring to FIGS. 1-4, the jaws 12, 14 basically include respective planar brace plates 16, 18 having substantially identical right triangular configurations and the same dimensions. The brace plates 16, 18 also have rectangular cross-sectional configurations. The brace plates 16, 18 further have respective pairs of first and second adjacent orthogonally-displaced side edge portions 16A, 16B and 18A, 18B (the legs of the right triangular configurations) extending at right angles to one another and respective third inclined edge portions 16C, 18C (the hypotenuses of the right triangular configurations) extending between and interconnecting the first and second side edge portions 16A, 16B and 18A, 18B.

The jaws 12, 14 also include respective linear horizontal base members 20, 22 and linear upright clamp members 24, 26. The base members 20, 22 and clamp members 24, 26 are rectangular in cross-section and have widths greater than the thicknesses of the planar brace plates 16, 18. Widths of the base members 20, 22 are greater than the widths of the clamp members 24, 26.

The base members 20, 22 have respective opposite upper and lower longitudinal surfaces 20A, 20B and 22A, 22B. The clamp members 24, 26 have respective opposite inner and outer longitudinal surfaces 24A, 24B and 26A, 26B. Respective longitudinal grooves 28, 30 and 32, 34 are formed in and extending between opposite ends of the upper longitudinal surfaces 20A, 22A and the inner longitudinal surfaces 24A, 26A of the respective base and clamp members 20, 22 and 24, 26. The grooves 28, 30 and 32, 34 of the base and clamp members 20, 22 and 24, 26 are rectangular in cross-section and of sizes adapted to snugly receive the first and second side edge portions 16A, 16B and 18A, 18B of the brace plates 16, 18. The first and second side edge portions 16A, 16B and 18A, 18B of the brace plates 16, 18 are secured in the respective longitudinal grooves 28, 30 and 32, 34 by any suitable means, such as adhesive or fasteners.

Referring to FIGS. 1-3, the holder assembly 10 also includes a pair of thin support pads 36, 38 of resiliently compressible material having rectangular configurations. The pads 36, 38 are secured to outer end portions of the lower longitudinal surfaces 20B, 22B of the base members 20, 22 and thereby underlie and support the bottoms of the horizontal base members 20, 22 of the jaws 12, 14 at the outer ends thereof. The resilient compressible material of the support pads 36, 38 provides a non-slip type of engagement of the pads 36, 38 with a support surface F, such as a floor, for holding the jaws 12, 14 in relatively stationary positions on the floor F.

Referring to FIGS. 1-4 and 6, the holder assembly 10 further includes a hinge 40 including a pair of side-by-side hinge members 42, 44 and a removable pin 46 pivotally coupling the hinge members 42, 44 together so as to establish a door receiving slot 48 between the upright clamp members 24, 26 of the jaws 12, 14. One hinge member 42 is rigidly attached to and extends longitudinally from an inner end of one horizontal base member 20, while the other hinge member 44 is rigidly attached to and extends longitudinally from an inner end of the other horizontal base member 22. As seen in FIGS. 3, 4 and 6, the hinge members 42, 44 have widths approximately one-half the widths of the respective base members 20, 22 and are offset along opposite sides of a vertical plane V through the longitudinal centers of the base members 20, 22, permitting the hinge members 42, 44 to assume side-by-side positions, as seen in FIG. 6.

The one hinge member 42 has a single hole 50 extending transversely therethrough, while the other hinge member 44 has a series of holes 52 extending transversely therethrough and longitudinally spaced from one another such that the removable pin 46 can be removably and adjustably received through preselected aligned ones of the holes 50, 52 of the hinge members 42, 44 for presetting the width of the slot 50 between the upright clamp members 24, 26 of the jaws 12, 14 to match the thickness of the door to be received in the slot 50.

Referring to FIGS. 5 and 7, in addition to their non-slip function, the resilient compressible support pads 36, 38 on the bottoms of the opposite outer end portions of the horizontal base members 20, 22 also function to elevate the holder assembly 10 above the floor F. Elevation of the outer end portions of the base members 20, 22 by the resilient support pads 36, 38 allows the adjacent inner end portions of the base members 20, 22 of the jaws 12, 14 and the hinge members 42, 44 of the pivotal hinge 40 to pivot upwardly away from the support surface to higher than the elevation of the outer end portions of the base members 20, 22 in order to place a door within the slot, as shown in FIG. 5, and to oppositely pivot downwardly toward the floor F to lower than the elevation of the outer end portions of the base members 20, 22 after the door D is placed within the slot 48 between the upright clamp members 24, 26 and the weight of a door is rested on the side-by-side hinge members 42, 44, as shown in FIG. 7.

Downward pivoting of the jaws 12, 14 at the inner end portions of the base members 20, 22 causes the vertical clamp members 24, 26 to pivot toward one another to a clenching position such that their inner longitudinal surfaces 24A, 26A form a tight gripping hold on the opposite sides of the door D position in the slot 48 therebetween. Thus, in such manner, the door D assists the holder assembly 10 in holding the door D in the desired vertical position by using its own weight. The clamping imposed by the jaws 12, 14 of the holder assembly 10 is instantaneous, while the release thereof is just as quick when the weight of the door D is lifted off the hinge 40 of the holder assembly 10.

The holder assembly 10 further preferably includes strips of scratch resistant lining material 54, 56 and 58, 60 such as fabricated of felt material, attached on the upright clamp members 24, 26 and on the hinge members 42, 44 so as to encompass the slot 48 and contact the door D inserted in the slot 48. More particularly, the strips of lining material 54, 56 and 58, 60 are attached on the inner longitudinal surfaces 22B of the upright clamp members 24, 26 and on the upper laterally inclined surfaces of the hinge member 42, 44. These strips of lining material minimize the possibility of the surfaces of the door D being scratched or marred by use of the holder assembly 10. The brace plates 16, 18 of the jaws 12, 14 have oblong handle slots 62, 64 formed therein which provide means for lifting and moving the jaws 12, 14. Also, as seen in FIG. 8 the holder assembly 10 includes a releasable latching or fastening means 66 having mating components which can bridge the upper ends of the clamp members 24, 26 to retain the jaws 12, 14 together for transport and storage during periods of non-use. The fastening means 66 can take any suitable form, such as strips of conventional hook and loop material.

To summarize, the advantages of the holder assembly 10 of the present invention are as follows. The holder assembly 10: (1) is lightweight and portable making it easy to carry; (2) both quickly clamps and releases a door or like object; (3) is easily used by one person; (4) is adjustable to accommodate doors of different thicknesses; (5) is reliable and durable; (6) is felt-lined to protect door finish; (7) has built-in handle grips; (8) has non-slip rubber base pads; (9) has jaws 12, 14 which latch together for easy handling; and (10) is low in cost.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A holder assembly for clenching a door in upright position, comprising:

(a) a pair of jaws having respective generally horizontal base members and upright clamp members;

(b) a hinge interconnecting adjacent inner end portions of said horizontal base members of said jaws so as to establish a generally vertical door receiving slot between said upright clamp members of said jaws, said hinge including a pair of side-by-side hinge members and a removable pin pivotally coupling said hinge members together, said hinge members having widths less than the widths of said base members and being offset along opposite sides of a vertical plane through longitudinal centers of said base members thereby permitting said hinge members to assume the side-by-side positions; and (c) a pair of support pads attached to and underlying opposite outer end portions of said horizontal base members of said jaws for holding said outer end portions of said base members in an elevated position above a support surface such that said base members of said jaws at said adjacent inner end portions thereof and said hinge members attached thereto are allowed to oppositely pivot upwardly away from the support surface to above the elevation of the outer end portions of the base members in order to place a door within the slot and to oppositely pivot downwardly toward the support surface to below the elevation of said outer end portions of said horizontal base members after a door is placed within said slot between said upright clamp members and the weight of the door is rested on said side-by-side hinge members, the opposite downward pivoting of said jaws at said inner end portions of said base members causing said upright clamp members to pivot toward one another and form a tight gripping hold on opposite sides of the door positioned in said slot between said clamp members.

2. The holder assembly of claim 1 wherein one of said pair of hinge members is rigidly attached to and extends longitudinally from said inner end portion of one of said horizontal base members, whereas the other of said pair of hinge members is rigidly attached to and extends longitudinally from said inner end of the other of said horizontal base members.

3. The holder assembly of claim 1 wherein said hinge members have widths approximately one-half of the widths of said base members.

4. The holder assembly of claim 1 wherein said horizontal base members and said upright clamp members are linear in longitudinal configuration and rectangular in cross-section.

5. The holder assembly of claim 4 wherein the widths of said horizontal base members are greater than the widths of said upright clamp members.

6. The holder assembly of claim 1 wherein the support pads are composed of substantially resilient compressible non-slip material for and retaining said jaws in a non-slip relation on the support surface.

7. A holder assembly for clenching a door in upright position, comprising:

(a) a pair of jaws each having a brace plate of right triangular configuration and a horizontal base member and an upright clamp member secured along adjacent orthogonally displaced edge portions of said brace plate;

(b) a hinge interconnecting adjacent inner end portions of said horizontal base members of said jaws so as to establish a door receiving slot between said upright clamp members of said jaws, said hinge including a pair of side-by-side hinge members and a removable pin pivotally coupling said hinge members together so as to establish a generally vertical door receiving slot between said upright clamp members of said jaws, said hinge members having widths less than the widths of said base members and being offset along opposite sides of a vertical plane through longitudinal centers of said base members thereby permitting said hinge members to assume the side-by-side positions; and (c) a pair of support pads attached to and underlying opposite outer end portions of said horizontal base members of said jaws for holding said outer end portions of said base members in an elevated position above a support surface such that said base members of said jaws at said adjacent inner end portions thereof and said hinge members attached thereto are allowed to oppositely pivot upwardly away from the support surface to above the elevation of the outer end portions of the base members in order to place a door within the slot and to oppositely pivot downwardly toward the support surface to below the elevation of said outer end portions of said horizontal base members after a door is placed within said slot between said upright clamp members and the weight of the door is rested on said side-by-side hinge members, the opposite downward pivoting of said jaws at said inner end portions of said base members causing said upright clamp members to pivot toward one another and form a tight gripping hold on opposite sides of the door positioned in said slot between said clamp members.

8. The holder assembly of claim 7 wherein said brace plates have planar longitudinal configurations and rectangular cross-sectional configurations.

9. The holder assembly of claim 8 wherein said horizontal base members and said upright clamp members have linear longitudinal configurations.

10. The holder assembly of claim 7 wherein one of said pair of hinge members is rigidly attached to and extends longitudinally from said inner end portion of one of said horizontal base members, whereas the other of said pair of hinge members is rigidly attached to and extends longitudinally from said inner end of the other of said horizontal base members.

11. The holder assembly of claim 7 wherein said hinge members have widths approximately one-half of the widths of said base members.

12. The holder assembly of claim 11 wherein said horizontal base members and said upright clamp members are linear in longitudinal configuration and rectangular in cross-section.

13. The holder assembly of claim 12 wherein the widths of said horizontal base members are greater than the widths of said upright clamp members.

14. The holder assembly of claim 7 wherein one of said pair of hinge members has a single hole extending transversely therethrough, whereas the other of said hinge members has a series of holes extending transversely therethrough and longitudinally spaced from one another such that said removable pin can be removably received through preselected aligned ones of the holes of the hinge members for presetting the width of said slot between said upright clamp members of said jaws to match the thickness of the door to be received in said slot.

15. The holder assembly of claim 7 wherein the support pads are composed of substantially resilient compressible non-slip material for and retaining said jaws in a non-slip relation on the support surface.

16. The holder assembly of claim 7 further comprising:

means for defining respective handle slots in said brace plates of said jaws.

17. A holder assembly for clenching a door in upright position, comprising:

(a) a pair of jaws having respective generally horizontal base members and upright clamp members;

(b) a hinge interconnecting adjacent inner end portions of said horizontal base members of said jaws so as to establish a generally vertical door receiving slot between said upright clamp members of said jaws, said hinge including a pair of side-by-side hinge members and a removable pin pivotally coupling said hinge members together, one of said pair of hinge members having a single hole extending transversely therethrough, the other of said hinge members having a series of holes extending transversely therethrough and longitudinally spaced from one another such that said removable pin can be removably received through preselected aligned ones of said holes of said hinge members for presetting the width of said slot between said upright clamp members of said jaws to match the thickness of the door to be received in said slot; and (c) a pair of support pads attached to and underlying opposite outer end portions of said horizontal base members of said jaws for holding said outer end portions of said base members in an elevated position above a support surface such that said base members of said jaws at said adjacent inner end portions thereof and said hinge members attached thereto are allowed to oppositely pivot upwardly away from the support surface to above the elevation of the outer end portions of the base members in order to place a door within the slot and to oppositely pivot downwardly toward the support surface to below the elevation of said outer end portions of said horizontal base members after a door is placed within said slot between said upright clamp members and the weight of the door is rested on said side-by-side hinge members, the opposite downward pivoting of said jaws at said inner end portions of said base members causing said upright clamp members to pivot toward one another and form a tight gripping hold on opposite sides of the door positioned in said slot between said clamp members.

18. A holder assembly for clenching a door in upright position, comprising:

(a) a pair of jaws each having a brace plate of right triangular configuration and a horizontal base member and an upright clamp member secured along adjacent orthogonally displaced edge portions of said brace plate;

(b) a hinge interconnecting adjacent inner end portions of said horizontal base members of said jaws so as to establish a door receiving slot between said upright clamp members of said jaws, said hinge including a pair of side-by-side hinge members and a removable pin pivotally coupling said hinge members together so as to establish a generally vertical door receiving slot between said upright clamp members of said jaws, and (c) a pair of support pads attached to and underlying opposite outer end portions of said horizontal base members of said jaws for holding said outer end portions of said base members in an elevated position above a support surface such that said base members of said jaws at said adjacent inner end portions thereof and said hinge members attached thereto are allowed to oppositely pivot upwardly away from the support surface to above the elevation of the outer end portions of the base members in order to place a door within the slot and to oppositely pivot downwardly toward the support surface to below the elevation of said outer end portions of said horizontal base members after a door is placed within said slot between said upright clamp members and the weight of the door is rested on said side-by-side hinge members, the opposite downward pivoting of said jaws at said inner end portions of said base members causing said upright clamp members to pivot toward one another and form a tight gripping hold on opposite sides of the door positioned in said slot between said clamp members;

(d) said base members having respective opposite upper and lower longitudinal surfaces and longitudinal grooves formed in said upper longitudinal surfaces, said clamp members having respective opposite inner and outer longitudinal surfaces and respective longitudinal grooves formed in said inner longitudinal surfaces of clamp members;

(e) said grooves of said base and clamp members being adapted to receive said first and second side edge portions of said brace plates.

19. The holder assembly of claim 18 further comprising:

a plurality of strips of scratch resistant lining material attached on said inner longitudinal surfaces of said upright clamp member and said pair of hinge members so as to encompass said slot and contact the door inserted in said slot.

* * * * *